United States Patent
Said et al.

(10) Patent No.: US 9,207,003 B2
(45) Date of Patent: Dec. 8, 2015

(54) INTERMITTENT ABSORPTION SYSTEM WITH A LIQUID-LIQUID HEAT EXCHANGER

(71) Applicant: KING FAHD UNIVERSITY OF PETROLEUM AND MINERALS, Dhahran (SA)

(72) Inventors: Syed A. M. Said, Dhahran (SA); Muhammad Umar Siddiqui, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 149 days.

(21) Appl. No.: 14/243,727

(22) Filed: Apr. 2, 2014

(65) Prior Publication Data

US 2015/0285542 A1 Oct. 8, 2015

(51) Int. Cl.
*F25B 27/00* (2006.01)
*F25B 17/02* (2006.01)

(52) U.S. Cl.
CPC .............. *F25B 27/007* (2013.01); *F25B 17/02* (2013.01)

(58) Field of Classification Search
CPC ........ F25B 27/007; F25B 17/02; F25B 27/00; F25B 15/00; F25B 17/00; F25B 30/02; F25B 30/04; F25B 39/00
USPC .............................. 62/106, 235.1, 238.3, 478
See application file for complete search history.

(56) References Cited

U.S. PATENT DOCUMENTS

| | | | |
|---|---|---|---|
| 2,389,967 A | 11/1945 | Kleen | |
| 2,597,779 A | 5/1952 | Coons | |
| 4,368,623 A * | 1/1983 | Knoche | F24D 17/02 62/106 |
| 4,744,224 A | 5/1988 | Erickson | |
| 5,787,720 A | 8/1998 | Lenz et al. | |
| 2009/0032215 A1* | 2/2009 | Muscatell | F24F 5/0046 165/45 |
| 2010/0011794 A1* | 1/2010 | De Lima | F01K 13/00 62/235.1 |
| 2010/0107593 A1* | 5/2010 | Wang | F25B 15/02 60/39.83 |
| 2010/0252232 A1* | 10/2010 | Reich | F28D 20/0034 165/48.1 |
| 2011/0048502 A1* | 3/2011 | Kikinis | F24D 11/0221 136/248 |
| 2011/0049908 A1* | 3/2011 | Chung | H02J 15/00 290/1 R |
| 2011/0066258 A1* | 3/2011 | Torzhkov | G05B 13/042 700/29 |
| 2011/0094227 A1* | 4/2011 | Ast | F01K 23/065 60/671 |

(Continued)

FOREIGN PATENT DOCUMENTS

JP 2005-236126 9/2005

*Primary Examiner* — Mohammad M Ali
(74) *Attorney, Agent, or Firm* — Richard C Litman

(57) ABSTRACT

The intermittent absorption system with a liquid-liquid heat exchanger includes two generator/absorber units that operate out-of-phase, a solar collector unit, a dephlegmator, a condenser unit, an evaporator, and valves to control the flow of aqua-ammonia coolant through the system. The system operates on a two-day cycle. On the first day, during the daytime, the first generator/absorber unit generates liquid ammonia, while on the second day of the cycle, the roles are reversed, the second generator/absorber unit generating liquid ammonia. At the start of each day, one generator/absorber unit is partially pressurized and the other partially depressurized by liquid-liquid heat exchange between their heat exchangers, followed by disconnecting the heat exchangers from each other and connecting the generator to the solar collector to complete pressurization. The liquid-liquid heat exchange between the generator/absorber units reduces the heat required from the solar collector to generate liquid ammonia refrigerant, improving the coefficient of performance.

2 Claims, 1 Drawing Sheet

(56) References Cited

U.S. PATENT DOCUMENTS

| | | | | |
|---|---|---|---|---|
| 2011/0226004 A1* | 9/2011 | Kontomaris | C09K 5/047 | 62/476 |
| 2011/0278307 A1* | 11/2011 | Muscatell | F24F 5/0046 | 220/592.2 |
| 2012/0011865 A1* | 1/2012 | Ivison | B01D 5/0015 | 62/79 |
| 2012/0167952 A1* | 7/2012 | Yashiki | F01K 25/10 | 136/248 |
| 2012/0216536 A1* | 8/2012 | Ma | F03G 6/00 | 60/641.8 |
| 2012/0222437 A1* | 9/2012 | Merritt | B01D 5/0006 | 62/101 |
| 2012/0285189 A1* | 11/2012 | Takeda | F01K 3/24 | 62/235.1 |
| 2012/0291433 A1* | 11/2012 | Meng | F01K 25/08 | 60/641.15 |
| 2013/0257056 A1* | 10/2013 | Ma | F03G 6/065 | 290/52 |
| 2013/0269373 A1* | 10/2013 | Radhakrishnan | F25B 25/02 | 62/79 |
| 2013/0340975 A1* | 12/2013 | Muscatell | F24F 5/0046 | 165/104.19 |

* cited by examiner

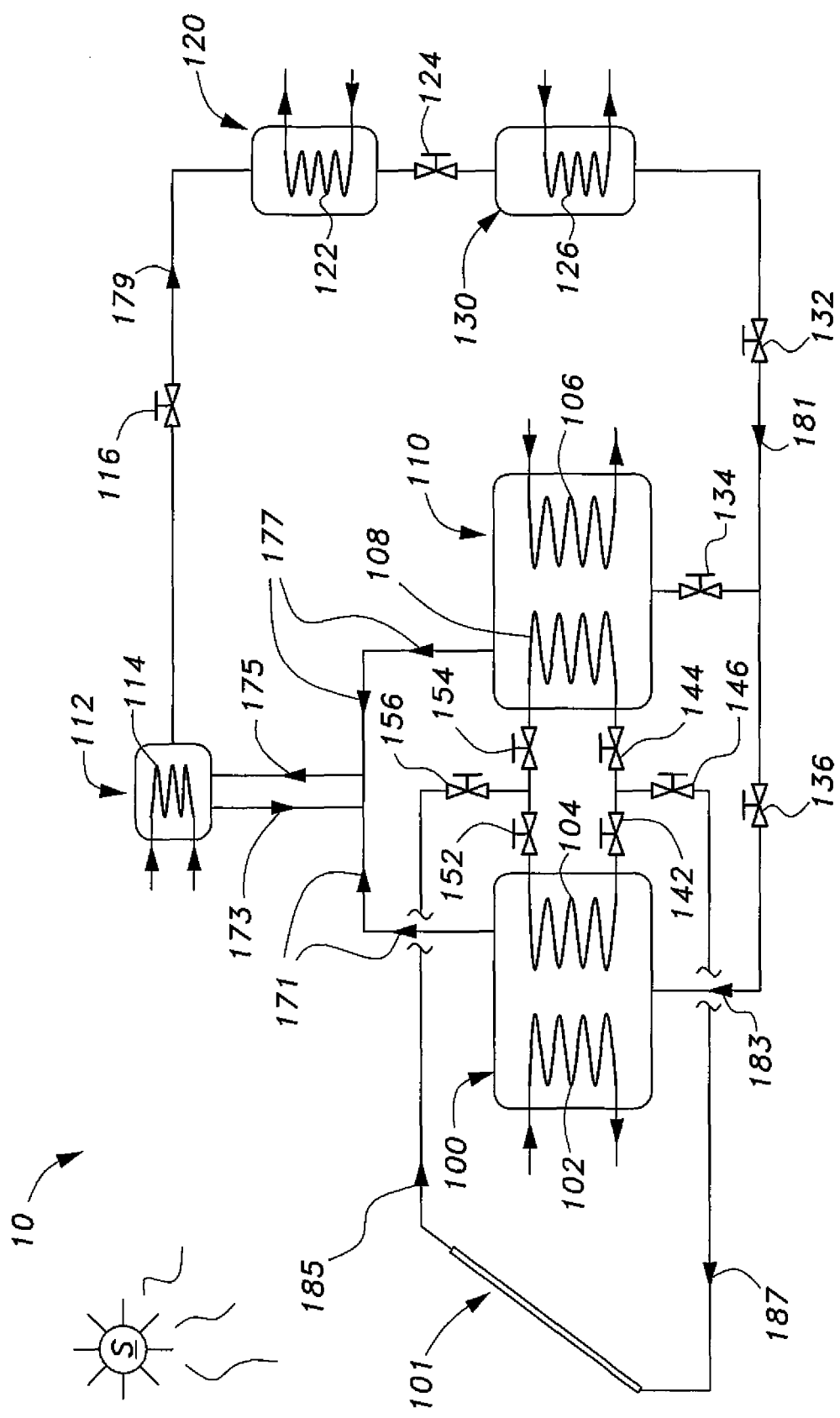

INTERMITTENT ABSORPTION SYSTEM WITH A LIQUID-LIQUID HEAT EXCHANGER

BACKGROUND OF THE INVENTION

1. Field of the Invention

The present invention relates to cooling and refrigeration systems, and more particularly to an intermittent absorption system with a liquid-liquid heat exchanger that uses waste heat to reduce the need for solar energy and increase the coefficients of performance of intermittent absorption air-conditioning and refrigeration systems.

2. Description of the Related Art

Conservation of energy, namely electricity, in both the production and consumption sectors, is continuing to be a worldwide priority. One such area is in the development of air-conditioning and refrigeration systems. It is no surprise that the days, times, and locations requiring maximum cooling loads coincide with the days and times with the highest temperatures and locations with the hottest climates. Conventional air-conditioning and refrigeration systems are powered using electricity. In the areas with the hottest climates and during the days and times with the hottest temperatures, the use of electricity to power such air-conditioning and refrigeration systems becomes very expensive and inefficient.

Solar power can be utilized to provide power for refrigeration and air-conditioning systems. Absorption chillers, for example, can use solar energy to produce refrigeration. Absorption chillers can be classified in two different categories, namely, continuous operation systems and intermittent operation systems. The difference between the two systems lies in their mode of operation. For example, in continuous systems both generation and absorption of energy take place at the same time in a continuous manner, whereas in intermittent systems, the generation and absorption of energy do not take place at the same time. Instead the generation and absorption of energy follow each other intermittently within the operation of the system.

Compared to continuous systems, intermittent systems have an advantage of not requiring any solution pump for their operation. Although not requiring a solution pump, their coefficient of performance is still comparatively very low. The main reason for higher coefficient of performance of continuous systems is their ability to recover waste energy by employing a liquid-liquid heat exchanger. The ability to recover waste heat in continuous operation systems is due to the fact that both absorption and generation take place at the same time so that both hot and cold solutions are present during the operation at the same time, hence making it possible to recover waste energy.

However, for conventional intermittent systems, it is not usually possible to use a liquid-liquid heat exchanger simultaneously for waste energy recovery due to the unavailability of hot and cold solutions at the same time. The inability of conventional intermittent systems to use a liquid-liquid heat exchanger simultaneously to recover waste energy results in a significant increase in capital cost and a decrease in its coefficient of performance, therefore, making conventional intermittent absorptions systems cost prohibitive and not economically feasible.

Thus, an intermittent absorption system with a liquid-liquid heat exchanger solving the aforementioned problems is desired.

SUMMARY OF THE INVENTION

The intermittent absorption system with a liquid-liquid heat exchanger includes two generator/absorber units that operate out-of-phase, a solar collector unit, a dephlegmator, a condenser unit, an evaporator, and valves to control the flow of aqua-ammonia coolant through the system. The system operates on a two-day cycle. On the first day, during the daytime, the first generator/absorber unit is pressurized to generate liquid ammonia, which is stored in the evaporator, while the second generator/absorber unit is depressurized by heat exchange with ambient air. At nighttime, liquid ammonia is evaporated to produce refrigerant effect, and the second generator/absorber unit acts as an absorber. On the second day of the cycle, the roles are reversed, the second generator/absorber unit generating liquid ammonia in the daytime and the first generator/absorber unit acting as an absorber. At the start of each day, one generator/absorber unit is partially pressurized and the other partially depressurized by liquid-liquid heat exchange between their heat exchangers, followed by disconnecting the heat exchangers from each other and connecting the generator to the solar collector to complete pressurization.

In this manner, part of the energy required to generate the aqua-ammonia vapor that is converted to liquid ammonia is derived from liquid-liquid heat exchange between hot and cold liquids simultaneously present in the system, which is heat energy that would otherwise be wasted. The balance of the energy required to generate the aqua-ammonia vapor is derived from the solar collector unit. However, the quantity of heat that must be derived from the solar collector is decreased by the liquid-liquid heat exchange, reducing the installation costs of the solar collector unit and improving the coefficient of performance of the intermittent absorption system in an energy efficient manner.

These and other features of the present invention will become readily apparent upon further review of the following specification and drawings.

BRIEF DESCRIPTION OF THE DRAWINGS

The sole drawing FIGURE is a schematic diagram of an intermittent absorption system with a liquid-liquid heat exchanger according to the present invention.

DETAILED DESCRIPTION OF THE PREFERRED EMBODIMENTS

Referring to the sole drawing FIGURE, the intermittent absorption system with a liquid-liquid heat exchanger, designated generally as 10 in the drawing, includes two generator/absorber units that operate out-of-phase. The intermittent absorption system 10 includes a first generator/absorber unit 100, a second generator/absorber unit 110, a dephlegmator unit 112, a condenser unit 120, an evaporator unit 130, and a solar collector unit 101 that uses electrical power derived from the sun to heat aqua-ammonia coolant that circulates throughout the system 10.

The first generator/absorber unit 100 houses a first heat exchanger 104 for heating purposes when the first generator/absorber unit 100 is operated as a generator, and a second heat exchanger 102 for cooling purposes when the first generator/absorber unit 100 is operated as an absorber. The second generator/absorber unit 110 also houses a first heat exchanger 108 for heating purposes when the second generator/absorber unit 110 is operated as a generator, and a second heat exchanger 106 for cooling purposes when the second generator/absorber unit 110 is operated as an absorber. As in conventional intermittent absorption chillers, the generator/absorber units typically operate as a generator in the daytime and as an absorber at nighttime.

The solar collector 101 is in communication with the first and second generator/absorber units 100, 110 by conduits controlled by valves 146 and 156. Valve 146 is located in the stem of a T-connection that includes valves 142 and 144, which connect one end of heat exchangers 104 and 108. Valve 156 is located in the stem of a T-connection that includes valves 152 and 154, which connect the opposite end of heat exchangers 104 and 108. When valves 146 and 156 are closed, valves 142, 144, 152, and 154 may be opened for liquid-liquid heat exchange between the generator heat exchanger 104 of the first generator/absorber unit 100 and the generator heat exchanger 108 of the second generator/absorber unit 110. When valves 146 and 156 are open, valves 142 and 152 may be open and valves 144, 154 closed to connect the solar collector 101 to the first generator/absorber unit 100, or valves 142 and 152 may be closed and valves 144, 154 open to connect the solar collector 101 to the second generator/absorber unit 110.

The first generator/absorber unit 100 and the second generator/absorber unit 110 are in communication with the dephlegmator unit 112. The dephlegmator unit 112 is located above both generator/absorber units 100, 110. The dephlegmator unit 112 houses a heat exchanger 114 and essentially acts as a reflux condenser that receives aqua-ammonia vapor from one of the generator/absorber units 100, 110 and passes ammonia vapor on to the condenser unit 120, while condensing water and returning the water to the corresponding generator/absorber unit 100, 110, thereby rectifying the aqua-ammonia vapor.

The dephlegmator unit 112 is in communication with the at least one condenser unit 120 through a conduit controlled by a ball valve 116. The condenser unit 120 houses a heat exchanger 122 for converting the ammonia vapor to liquid ammonia, and is in communication with the evaporator unit 130 through conduit controlled by a valve 124. The liquid ammonia produced by the condenser unit 120 is stored in the evaporator unit 130 in the daytime.

The evaporator unit 130 houses a heat exchanger 126. At nighttime, the pressure in the evaporator unit is decreased so that the ammonia is converted to vapor, producing a refrigeration effect in the heat exchanger 126. The evaporator unit 130 is in communication with one or the other of the generator/absorber units 100, 110 through conduit controlled by a throttling valve 132. It is should be understood that the valves used in the intermittent absorption system with a liquid-liquid heat exchanger 10 are not limited to ball valves and throttling valves, but can also include valves such as check valves, gate valves, globe valves, and butterfly valves, for example. When valves 132 and 134 are open and valve 136 is closed, the evaporator unit 130 is connected to the second generator/absorber unit 110 so that the ammonia vapor is absorbed by the second generator/absorber unit 110. When valves 132 and 136 are open and valve 134 is closed, the evaporator unit 130 is connected to the first generator/absorber unit 100 so that the ammonia vapor is absorbed by the first generator/absorber unit 100.

Due to the intermittent nature of the system 10, each of the two generator/absorber units 100 and 110 behaves as a generator during the day and behaves as an absorber during the night. The system 10 operates on a 48-hour cycle. The process begins with a partial pressurization of a strong aqua-ammonia solution in the first generator/absorber unit 100 and a partial depressurization of a weak aqua-ammonia solution in the second generator/absorber unit 110 during the daytime of the first day of the 48-hour cycle.

The partial pressurization and depressurization processes are commenced by the heat transfer between the cold, strong aqua-ammonia solution of the first generator/absorber unit 100 and the hot, weak aqua-ammonia solution of the second generator/absorber unit 110 by connecting heat exchangers 104 and 108 for liquid-liquid heat exchange. During the partial pressurization/partial depressurization processes, the solar collector 101 is kept isolated from the generator/absorber units 100, 110 by closing valves 156 and 146. While valves 156 and 146 are closed, valves 152 154, 142, and 144 are opened to allow the liquid-liquid heat exchange to occur between the first generator/absorber unit 100 and the second heat generator/absorber unit 110. The flow required for this heat exchange to take place is provided by a thermo-siphon effect between the heat exchangers 104, 108.

The water in heat exchange coil 108 of the second generator/absorber 110 gains the heat from the hot weak aqua-ammonia solution in the second generator/absorber unit 100 and becomes less dense. The water in the heat exchange coil 108 of the second generator/absorber 110 is then transferred to the heat exchange coil 104 in the first generator/absorber 100. As the water from the second generator/absorber unit 110 is absorbed into the heat exchange coil 104 it loses heat to the cold strong aqua-ammonia solution in the first generator/absorber unit 100. The coolant (which may be water) within the heat exchanger 108 gains heat from the hot, weak aqua-ammonia solution, becomes less dense, and rises to enter heat exchanger 104, where it loses heat to the comparatively cold, weak aqua-ammonia solution within the first generator/absorber unit 100.

As a result, the temperature of the cold, strong aqua-ammonia solution in the first generator/absorber unit 100 will rise, while the temperature of the hot, weak aqua-ammonia solution in the second generator/absorber unit 110 will decrease. Ideally, the temperature of the cold, weak aqua-ammonia solution in the first generator/absorber unit would rise to equilibrium, where it would be equal to the temperature of the hot, weak aqua-ammonia solution in the second generator/absorber unit 110. However, practically, heat exchange will continue until a temperature difference of $\Delta T_{min}$ is maintained between the cold, strong aqua-ammonia solution in the first generator/absorber unit 100 and the hot weak aqua-ammonia solution in the second generator/absorber unit 110, such that temperature of the weak aqua-ammonia solution in the second generator/absorber unit 110 is higher than the strong aqua-ammonia solution in the first generator/absorber unit 100. During this process, partial cooling of weak aqua-ammonia solution in the second generator/absorber unit 110 occurs and partial heating of strong aqua-ammonia solution in the first generator/absorber unit 100 also occurs.

Once the temperature difference of $\Delta T_{min}$ is maintained between the cold strong aqua-ammonia solution in the first generator/absorber unit and the hot weak aqua-ammonia solution in the second generator/absorber unit, the second generator/absorber 110 is disconnected from the first generator/unit 100 and the first generator/absorber unit 100 is connected to the solar collector 101. This can be accomplished by closing valves 144, 154 and opening valves 146, 156.

The pressurization of the first generator/absorber unit 100 continues beyond the partial pressurization of two connected generator/absorber units by heat transfer 185 from the sun S through the solar collector 101 during daytime of the first day of the 48-hour cycle. During first 24 hours within a 48-hour cycle, the first generator/absorber unit 100 operates as a generator as heat is added to the system through the heat exchanger 104 from the solar collector 101 at constant pressure.

As a result of the heat transfer 185 from the solar collector 101, the temperature of the strong aqua-ammonia solution in the first generator/absorber unit 100 rises. As a result of the generation process and the heat gained through the solar collector 101, aqua-ammonia vapor forms in the first generator/absorber unit 100 and the concentration of the strong aqua-ammonia solution drops, which also further increases the temperature of the solution.

The first heat exchange coil 104 continues the generation process and the water content inside of the generated aqua-ammonia vapor increases as the temperature in the first generator/absorber unit 100. Meanwhile, depressurization of the weak aqua-ammonia solution in the second generator/absorber 110 also occurs, as the heat exchanger 106 rejects the heat to ambient air. This decrease in temperature is accompanied by a decrease in pressure as depressurization continues throughout the daytime of the first day of the 48-hour cycle.

During the daytime of the first day, the valve 172 is open and the valve 174 is closed so that the aqua-ammonia vapor generated in the first generator/absorber unit 100 rises to the dephlegmator unit 112 via conduit paths 171, 175. In the dephlegmator 112, water condenses from the aqua-ammonia vapor (being cooled by heat exchanger 114) and returns to the first generator/absorber unit 100 via conduit path 173, 171. The pure or rectified ammonia vapor continues to the condenser unit 120 via conduit path 179 as regulated by valve 116. The rectified or purified ammonia vapor is condensed by rejecting the heat to the heat exchanger 122, then passed through valve 124 and is stored as saturated liquid ammonia inside of the evaporator 130 during the day of the first day of the 48-hour cycle.

The process continues during the nighttime of the first day of the 48-hour cycle, when the second generator/absorber unit 110 operates as an absorber for the intermittent system 10. At this point, the throttling valve 132 is opened, which reduces the pressure inside of the evaporator unit 130 so that the ammonia vaporizes, producing a refrigeration effect in the heat exchanger 126 as a result of the evaporation of the refrigerant. The heat exchanger 126 inside of the evaporator unit 130 can be filled with a brine solution to avoid the heat exchanger 126 becoming inoperative if the refrigerant effect is below the freezing point of water. The ammonia refrigerant vapor is then moved from the evaporator unit 130 through the throttling valve 132 and directed by conduit path 181 through the ball valve 134 to the second generator/absorber unit 110 for absorption of the ammonia vapor into the weak aqua-ammonia solution inside the unit 110.

The valve 136 is closed through this nighttime phase of the first day of the 48-hour cycle to in order keep the first generator/absorber unit 100 isolated from the absorption process. In keeping the first generator/absorber unit 100 isolated, a strong aqua-ammonia solution is produced inside the second generator/absorber unit 110 so the heat is not absorbed by the heat exchanger 106 during the nighttime phase of the first day of the 48-hour cycle. A coolant is provided to the heat exchange coil 106 in the second generator/absorber unit 110, the condenser unit 120, and the dephlegmator unit 112 during day of the first day of the 48-hour cycle and to the heat exchange coil 106 during the night of the first day of the 48-hour cycle.

At the start of the first day of the 48-hour cycle, the first generator/absorber unit 100 was initially filled with cold strong aqua-ammonia solution and the second generator/absorber unit 110 was initially filled with hot weak aqua-ammonia solution. After the operations during the first 24, the first generator/absorber unit 100 contains hot, weak aqua-ammonia solution and the second generator/absorber unit 110 contains cold, strong aqua-ammonia solution.

Continuing the process into the second day of the 48-hour cycle, the intermittent absorption system reverses its method of operation. The second day of the 48-hour cycle begins with the partial pressurization of the second generator/absorber unit 110 instead of the first generator/absorber unit 100, and the partial depressurization of the first generator/absorber unit 100. The partial pressurization/partial depressurization process begins by closing valves 146 and 156 to isolate the solar collector 101 from the generator/absorber units 100, 110 and opening valves 142, 152, 144, and 154 to connect heat exchangers 104 and 108 for liquid-liquid heat exchange, as described above. During this process, the strong, cold aqua-ammonia solution in the second generator/absorber unit is partially heated, and the weak, hot aqua-ammonia solution in the first generator/absorber unit is partially cooled.

Once the partial pressurization of the second generator/absorber unit 110 and depressurization of the first generator/absorber unit 100 is complete, the first generator/absorber 100 is disconnected from the second generator/absorber unit 110. Valves 142 and 152 are closed and valves 146, 156 are opened, thereby connecting the solar collector 101 to the generator heat exchanger 108 of the second generator/absorber unit 110. At the same time, heat exchanger 102 cools the weak aqua-ammonia solution in the first generator/absorber unit 100, thereby continuing depressurization during the daytime of the second day of the 48-hour cycle.

The pressurization continues to occur within the second generator/absorber unit 110 by gaining heat from the solar collector 101. The pressurization in the second generator/absorber unit 110 is followed by the processes of generation of aqua-ammonia vapor, dephlegmation, and condensation of liquid ammonia in a similar manner as that described during daytime of the first day of the 48-hour cycle. The aqua-ammonia vapor rises to the dephlegmator 112 via conduit path 177, 175, while keeping the valve 174 open and the valve 172 closed, and the condensed water returns to the second generator/absorber unit via conduit path 173, 177. Rectified ammonia vapor travels from the dephlegmator 112 to the condenser via conduit 179, regulated by valve 116, is condensed to saturated liquid ammonia refrigerant in condenser 120, and is stored in the daytime of the second day in the evaporator unit 130.

The process continues during the night of the second day of the 48-hour cycle, where the first generator/absorber unit 100 operates as an absorber for the intermittent system 10. At this point the throttling valve 132 is opened, which reduces the pressure inside of the evaporator unit 130 and produces a refrigeration effect in the heat exchange coil 126 as a result of the evaporation of the refrigerant. The heat exchange coil 126 inside of the evaporator unit 130 may be filled with a brine solution to avoid the heat exchange coil 126 becoming inoperative if the refrigerant effect is below the freezing point of water. The ammonia refrigerant vapor is then moved from the evaporator unit 130 through the throttling valve 132 and directed by conduit path 181 through the ball valve 136 to the first generator/absorber 100 for absorption of the ammonia into the weak aqua-ammonia solution inside. Valve 134 is closed during this process.

In keeping the second generator/absorber unit 110 isolated, a strong aqua-ammonia solution is produced inside the first generator/absorber unit 100, as the heat is not absorbed by the heat exchanger 102 during the nighttime phase of the second day of the 48-hour cycle. A coolant is provided to the heat exchange coil 102 in the first generator/absorber unit 100, the condenser unit 120, and the dephlegmator unit 112 during daytime of the second day of the 48-hour cycle and to the heat exchange coil 102 during the nighttime of the second 24 hours in a 48-hour cycle.

At the beginning of the second 24 hours of the 48-hour cycle, the second generator/absorber unit 110 was filled with cold, strong aqua-ammonia solution and the first generator/absorber unit 100 was filled with hot, weak aqua-ammonia solution. After the operations during the second day of the 48-hour cycle, the second generator/absorber unit 110 contains hot, weak aqua-ammonia solution and the first generator/absorber unit 100 contains cold, strong aqua-ammonia solution.

This 48-hour cycle then repeats itself indefinitely to maintain the intermittent absorption system for as long as desired. The system 10 thus uses liquid-liquid heat exchange during the pressurization/depressurization stages at the start of each day to recapture heat that would otherwise be wasted to ambient air through the absorber heat exchangers 102, 106 to reduce the energy demands on the solar collector unit 101, thereby permitting a smaller, low-cost solar collector installation and improving the coefficient of performance of the system 10.

The intermittent absorption system 10 may include a conventional control system to control the timing of opening and closing the various valves, which may be solenoid valves or servo motor-controlled valves, in the system 10. The control system may include a processor, such as a programmable logic controller, a timer circuit, and various sensors, including photodetectors, temperature sensors, pressure sensors, etc., as is known in the art.

It is to be understood that the present invention is not limited to the embodiments described above, but encompasses any and all embodiments within the scope of the following claims.

We claim:

1. An intermittent absorption system with a liquid-liquid heat exchanger, comprising:
    a first combination generator/absorber unit and a second combination generator/absorber unit, each of the combination generator absorption units having a generator heat exchanger and an absorber heat exchanger;
    a dephlegmator;
    a condenser;
    an evaporator;
    a solar collector unit;
    a conduit system connecting the combination generator/absorber units, the dephlegmator, the condenser, the evaporator, and the solar collector unit;
    a plurality of valves disposed in the conduit system for controlling coolant flow, the conduit system and the valves being configured so that:
        the solar collector panel is selectively connected by the conduit system to the generator heat exchanger of the first combination generator/absorber unit, the generator heat exchanger of the second combination generator/absorber unit, or neither of the combination generator/absorber units; and
        the generator heat exchanger of the first combination generator/absorber unit and the generator heat exchanger of the second combination generator/absorber unit are selectively connected to each other for liquid-liquid heat exchange between the combination generator/absorber units; and
    an aqua-ammonia coolant circulating in the conduit system, the coolant including ammonia refrigerant and water absorber.

2. A method for intermittent absorption chilling and refrigeration in a 48-hour duty cycle, comprising the steps of:
    disconnecting a solar collection unit from a first combination generator/absorber unit and a second combination generator/absorber unit;
    connecting a generator heat exchanger of the first combination generator/absorber unit to a generator heat exchanger of the second combination generator/absorber unit for liquid-liquid heat exchange to partially pressurize the first combination generator/absorber unit and partially depressurize the second combination generator/absorber unit;
    after partial pressurization and depressurization of the combination generator/absorber units, connecting the solar collection unit to the first combination generator/absorber unit to pressurize the first combination generator/absorber unit while depressurizing the second combination generator/absorber unit;
    storing liquid ammonia generated by the first combination generator/absorber unit in an evaporator during daytime of the first day of the 48-hour duty cycle;
    evaporating the liquid ammonia during the nighttime of the first day of the 48-hour duty cycle to produce a refrigerant effect in the evaporator;
    directing flow of the evaporated ammonia to the second combination generator/absorber unit for absorption during nighttime of the first day of the 48-hour duty cycle;
    thereafter, disconnecting the solar collection unit from the first combination generator/absorber unit and the second combination generator/absorber unit;
    thereafter, connecting the generator heat exchanger of the first combination generator/absorber unit to the generator heat exchanger of the second combination generator/absorber unit for liquid-liquid heat exchange to partially pressurize the second combination generator/absorber unit and partially depressurize the first combination generator/absorber unit;
    after partial pressurization and depressurization of the combination generator/absorber units, connecting the solar collection unit to the second combination generator/absorber unit to pressurize the second combination generator/absorber unit while depressurizing the first combination generator/absorber unit during daytime of the second day of the 48-hour duty cycle;
    storing liquid ammonia generated by the second combination generator/absorber unit in an evaporator during daytime of the second day of the 48-hour duty cycle;
    evaporating the liquid ammonia during the nighttime of the second day of the 48-hour duty cycle to produce a refrigerant effect in the evaporator; and
    directing flow of the evaporated ammonia to the first combination generator/absorber unit for absorption during nighttime of the second day of the 48-hour duty cycle.

* * * * *